May 19, 1953

R. S. CESARO ET AL 2,638,784

TEMPERATURE SENSING DEVICE

Filed March 19, 1951

Inventors
RICHARD S. CESARO
ROBERT J. KOENIG
By
Schmitt
Walter S. Pawl
Attorneys Patented May 19, 1953

2,638,784

UNITED STATES PATENT OFFICE 2,638,784

TEMPERATURE SENSING DEVICE

Richard S. Cesaro and Robert J. Koenig,
Cuyahoga County, Ohio

Application March 19, 1951, Serial No. 216,448

3 Claims. (Cl. 73—339)

(Granted under Title 35, U. S. Code (1952),
sec. 266)

This present invention relates to gas temperature sensing devices, for both static and flowing gases over a wide range of pressures and temperatures.

One application of this invention is to gas turbine engines. Devices commonly in use for sensing the temperature of the gaseous products of combustion in gas turbine engines are unsatisfactory in many respects. The acceleration of gas turbine engines, especially those used in aircraft, is commonly produced by increasing the fuel flow, which is accompanied by an increase in combustion gas temperature, often to values which may exceed the temperature limitation of the engine. Temperature sensing devices and associated fuel flow control means of rapid response are therefore required to prevent overheating of the engine during acceleration.

Means for sensing the gas temperature, such as thermocouples and resistance thermometers, are subject to errors due to radiation, conduction, and oxidation which errors may be as much as 200° to 250° at 1800° F. gas temperature operation. Such devices are also subject to rapid deterioration when used in gas turbines and their response rate is inadequate for use in aircraft power plants.

An object of this invention is to provide a gas temperature sensing means having a suitable output for control applications, utilizing the discharge potential of a spark-gap which depends upon the density and therefore the temperature of the gas.

Another object is to provide a gas temperature sensing means not subject to errors due to radiation, oxidation, and conduction.

Another object is to provide a gas temperature sensing means which will sense the stream static temperature of a flowing gas.

Another object is to provide a gas temperature sensing means having a rapid response rate.

A further object is to provide a gas temperature sensing means having a long life and one not subject to rapid deterioration.

A still further object is to provide a gas temperature sensing device having a greater sensitivity, accuracy, longer life, and faster response rate than those presently in use.

Other objects and features of the invention will become apparent to those skilled in the art as the disclosure is made in the following detailed description of a preferred embodiment of the invention as illustrated in the accompanying sheet of drawing in which.

Figure 2:
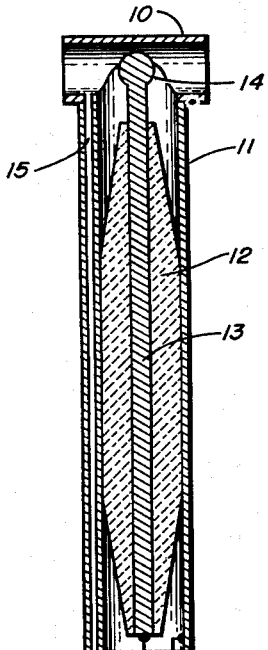
Fig. 2 is a sectional view of the temperature sensing means taken on line 2—2 of Fig. 1.
Figure 2:
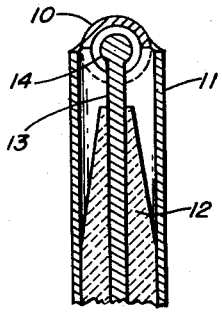
Figure 1:
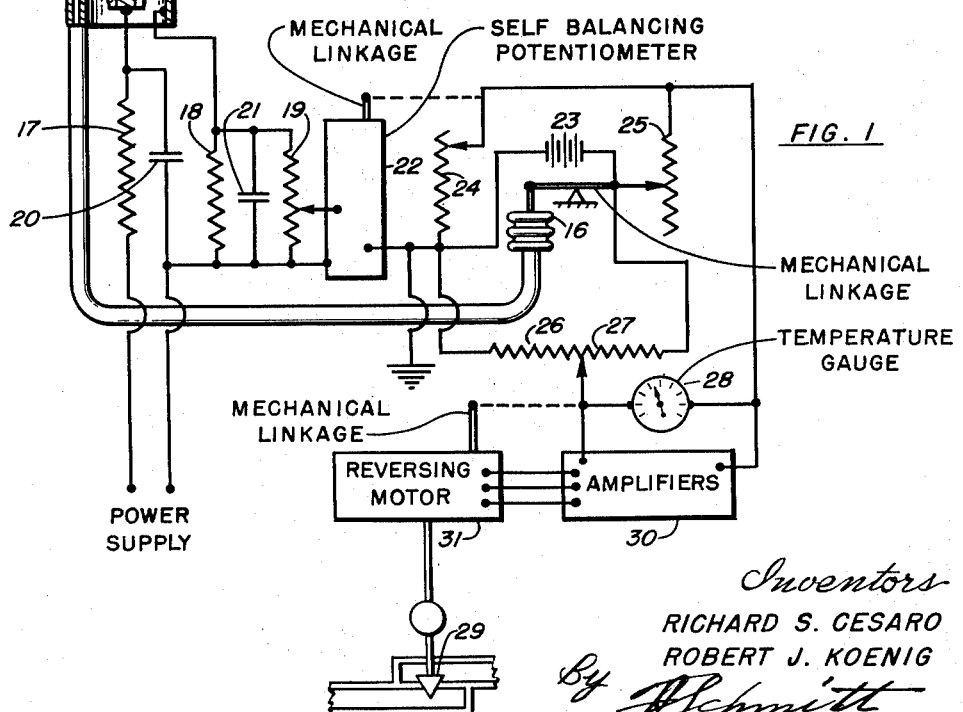
Fig. 1 is a sectional view of the invention with the control means in somewhat schematic form.

Referring to the drawing, in which like numerals indicate like parts in the two views, a gas chamber or conduit 10, has inserted in its side a probe 11 of conductive metal and welded or otherwise sealed to conduit 10. Within probe 11 is insulator 12, and conductor 13 having an electrode 14 of spherical shape at its end. A second tube 15 opens into conduit 10 and is connected to the static pressure responsive device shown at 16.

A high voltage direct current is connected to conduit 10 and conductor 13 in the electrical circuit including resistors 17, 18, and 19; capacitors 20 and 21; and a self-balancing potentiometer 22.

A second electrical circuit including a current source 23 and potentiometers 24, 25, 26, and 27 provides a temperature measurement indicated on gauge 28, and a position output which can be used to position a valve 29 by means of amplifiers 30 and a reversing motor 31.

The minimum voltage required to maintain a spark discharge between the gap formed by conduit 10 and electrode 14 immersed in the gas is primarily a function of the geometric proportions of the electrodes, the gap spacing, and the density of the gas. This relationship is given by the following equation:

$$E = (A+B)\rho l \qquad (1)$$

where $E$ = Minimum voltage required to maintain a spark discharge
$A, B$ = constants
$\rho$ = density of gas between electrodes
$l$ = gap spacing Gas density $\rho$ can be expressed as $$\rho = \frac{P}{RT} \qquad (2)$$

where $P$ = absolute static gas pressure
$R$ = gas constant
$T$ = absolute temperature Combining Equations 1 and 2 and expressing them in terms of temperature give the following equation:

$$T = (A+B)\frac{Pl}{RE} \qquad (3)$$

For a given temperature sensing probe, electrode design and gap spacing are fixed. Equation 3 can be simplified by combining B, l and R into a single constant K to give $$T = (A+K)\frac{P}{E} \qquad (4)$$

Absolute gas temperature can then be obtained from measurements of static pressure and of spark-over voltage.

In operation, capacitor 20 charges through resistor 17 (which is large) until the voltage is high enough to cause electrical breakdown in the spark gap between electrode 14 and conduit 10, at which time capacitor 20 discharges. The spark gap current develops voltage across resistor 18 which charges capacitor 21 to some average voltage proportional to gas density (see Equation 1).

Resistor 19 is a voltage divider to supply input to the self-balancing potentiometer 22 of such a magnitude that the potentiometer 22 will operate in a good range. The output position of potentiometer 22 is proportional to gas density. This position can be translated to a position of the arm of another potentiometer 24 which is in a bridge circuit. Potentiometer 25 is similarly positioned by a pressure responsive device 16 so its position is proportional to pressure.

$$\frac{R25}{R24} = \frac{R27}{R26} \text{ at balance} \qquad (5)$$

where the various R-subscripts signify the corresponding potentiometer resistances.

Balance is achieved by having the motor 31 also change R26, R27 as required.

Since R24 is proportional to spark-over voltage and R25 is proportional to gas pressure $$\frac{P}{E} \propto \frac{R25}{R24} = \frac{R27}{R26} \text{ at balance} \qquad (6)$$

therefore $$T \propto \frac{R27}{R26} \text{ at balance} \qquad (7)$$

Since $$T \propto \frac{P}{E} \qquad (8)$$

This relationship can be expressed as Equation 4 by proper choice of constants.

A voltage indication of the temperature measurement can be obtained by connecting a voltmeter 28 to the bridge circuit 23, 24, 25, 26, and 27 and calibrating the scale on the voltmeter in the temperature units desired.

The valve 29 is positioned by the reversing motor 31 as a function of temperature through amplification of the output voltage of the bridge circuit by amplifiers 30.

The invention described herein may be manufactured and used by or for the Government of the United States of America for governmental purposes without the payment of any royalties thereon or therefor.

What is claimed is:

1. A device for sensing the temperature of a gas consisting of two electrodes forming a spark gap, said electrodes immersed in the gas, means for sensing the static pressure of the gas at the spark gap, means for determining an average spark-over voltage, means for dividing the pressure sense by the average spark-over voltage and thereby obtain an output proportional to stream static temperatures.

2. The device set forth in claim 1 in which the means for determining the average spark-over voltage is composed of electrical capacitors and resistors.

3. The device set forth in claim 1 in which the average spark-over voltage is divided into the pressure sense by means of an electrical bridge circuit.

RICHARD S. CESARO.
ROBERT J. KOENIG.

No references cited.